(12) United States Patent
Zitzlaff

(10) Patent No.: US 7,261,496 B2
(45) Date of Patent: Aug. 28, 2007

(54) TWO-PART CLAMPING CLAW

(75) Inventor: Wolfgang Zitzlaff, Teck (DE)

(73) Assignee: Ceramtec AG, Innovative Ceramic Engineering, Plochingen (DE)

( * ) Notice: Subject to any disclaimer, the term of this patent is extended or adjusted under 35 U.S.C. 154(b) by 357 days.

(21) Appl. No.: 11/125,825

(22) Filed: May 10, 2005

(65) Prior Publication Data

US 2005/0253319 A1 Nov. 17, 2005

(30) Foreign Application Priority Data

May 13, 2004 (DE) ...................... 10 2004 023 570

(51) Int. Cl.
*B26D 1/00* (2006.01)
(52) U.S. Cl. ...................... 407/107; 407/104
(58) Field of Classification Search .................. 407/41, 407/49, 91, 93, 94, 106, 107, 108, 109, 104
See application file for complete search history.

(56) References Cited

U.S. PATENT DOCUMENTS

| | | | | |
|---|---|---|---|---|
| 3,303,553 A | * | 2/1967 | Severson ........................ 407/6 |
| 4,050,127 A | * | 9/1977 | Bodem et al. ............... 407/107 |
| 4,286,901 A | * | 9/1981 | Eckle .......................... 407/109 |
| 4,400,116 A | * | 8/1983 | Buchmann et al. ............ 407/3 |
| 5,586,844 A | * | 12/1996 | Nyman ....................... 407/105 |
| 5,820,311 A | * | 10/1998 | Grun et al. .................. 407/102 |
| 6,168,356 B1 | * | 1/2001 | Sjoo et al. ................... 407/104 |
| 6,682,273 B2 | * | 1/2004 | Sjoo et al. ................... 407/105 |
| 6,773,210 B2 | * | 8/2004 | Erickson ..................... 407/102 |
| 7,195,427 B2 | * | 3/2007 | Sjoo et al. ..................... 407/82 |

* cited by examiner

*Primary Examiner*—Willmon Fridie, Jr.
(74) *Attorney, Agent, or Firm*—Fulbright & Jaworski L.L.P.

(57) ABSTRACT

The invention relates to a clamping claw having a securing leg and a clamping leg for securing an object in a first recess of a support, with the clamping claw in the installed state being secured on the support by way of its securing leg by means of a bolt and clamping the object in the recess by means of its clamping leg. To split the application of axial force applied to an object by a clamping claw in part into an application of force that acts transversely thereto, the clamping claw includes two portions, namely a clamping base and a clamping finger, the clamping base sits on the support in the installed state of the clamping claw, the clamping finger has a securing leg and a clamping leg, and the installed state the securing leg sits on the clamping base over an oblique plane formed as a sliding surface and clamps the object with its clamping leg.

9 Claims, 2 Drawing Sheets

TWO-PART CLAMPING CLAW

This application claims priority from German Patent Application No: 102 004 023570.8 filed May 13, 2004, incorporated herein by reference in its entirety.

FIELD OF THE INVENTION

The invention relates to a clamping claw.

BACKGROUND AND SUMMARY OF THE INVENTION

Clamping claws are generally used to secure an object in a recess of a support. The clamping claws have a securing leg and a clamping leg, with the clamping claw in the installed state being secured on the support by way of its securing leg by means of a bolt and clamping the object in the recess by means of its clamping leg.

Such clamping claws are used, for example, as part of a cutting tool for machining metallic materials, with the support also being referred to as a gripping holder. The object that is clamped by means of the clamping claw in this connection is a cutting plate made from a ceramic material, hard metal or other material that is suitable for machining.

The underlying aim of the invention is to convert the application of axial force applied to an object by a clamping claw in part into an application of force that acts transversely thereto so that the object is pressed not only onto the support, but also onto the side wall of the recess.

The clamping claw includes two portions, namely a clamping base and a clamping finger.

The clamping base sits on the support in the installed state of the clamping claw.

The clamping finger has a securing leg and a clamping leg, and in the installed state the securing leg sits on the clamping base over an oblique plane formed as a sliding surface and clamps the object with its clamping leg.

During clamping the bolt presses the securing leg of the clamping finger onto the clamping base and secures both on the support, in which case as a result of the oblique plane that is formed as a sliding surface the securing leg and thus the clamping leg of the clamping finger execute a lateral movement transversely in relation to the longitudinal axis of the clamping base.

The application of force applied to the object by the clamping claw is split into an axial component and a component that acts transversely thereto.

So that the component that acts transversely in relation to the axial component draws the object into the recess of the support, a trough, for example, into which, for example, a cam on the clamping leg of the clamping finger engages, is arranged in the object.

The clamping base is advantageously secured on the support in a secure manner with respect to rotation, but so that it can be displaced in the clamping direction. To this end, at least one projection that extends parallel to the longitudinal axis of the clamping base and engages into a longitudinal slot in the support that is matched thereto is arranged on the clamping base.

In a preferred embodiment, the clamping base at its end that faces the securing leg of the clamping finger has an oblique plane that is formed as a sliding surface, and the securing leg of the clamping finger at its end that faces the clamping base likewise has an oblique plane that is formed as a sliding surface. Both sliding surfaces are matched to each other and are formed so that they slide one on top of the other.

The clamping base in the installed state preferably rests with a first guide surface against a second guide surface on the securing leg so that the securing leg of the clamping finger is arranged on the clamping base in a secure manner with respect to rotation. Since the clamping base also sits on the support in the installed state in a secure manner with respect to rotation, the clamping finger is also arranged on the support in a secure manner with respect to rotation. This is necessary in order to achieve correct clamping of the object.

Advantageously, the clamping base has a projecting flange with which the clamping base sits on a recess in the support in the installed state.

The clamping claw is preferably a part of a cutting tool for machining metallic materials, in which case the support is a gripping holder and the object is a cutting plate.

In an advantageous embodiment, arranged on the clamping leg of the clamping finger there is a raised portion, like a cam for example, which in the installed state engages into a corresponding trough in the object or in the cutting plate.

In a preferred development in accordance with the invention, the raised portion or the cam on the clamping leg of the clamping finger is formed as a circular ring which in the installed state engages into an object or a cutting plate that has a spherical or circular raised portion and in so doing embraces the raised portion.

The invention is explained in greater detail in the following with the aid of six figures.

DETAILED DESCRIPTION

Figure 1:
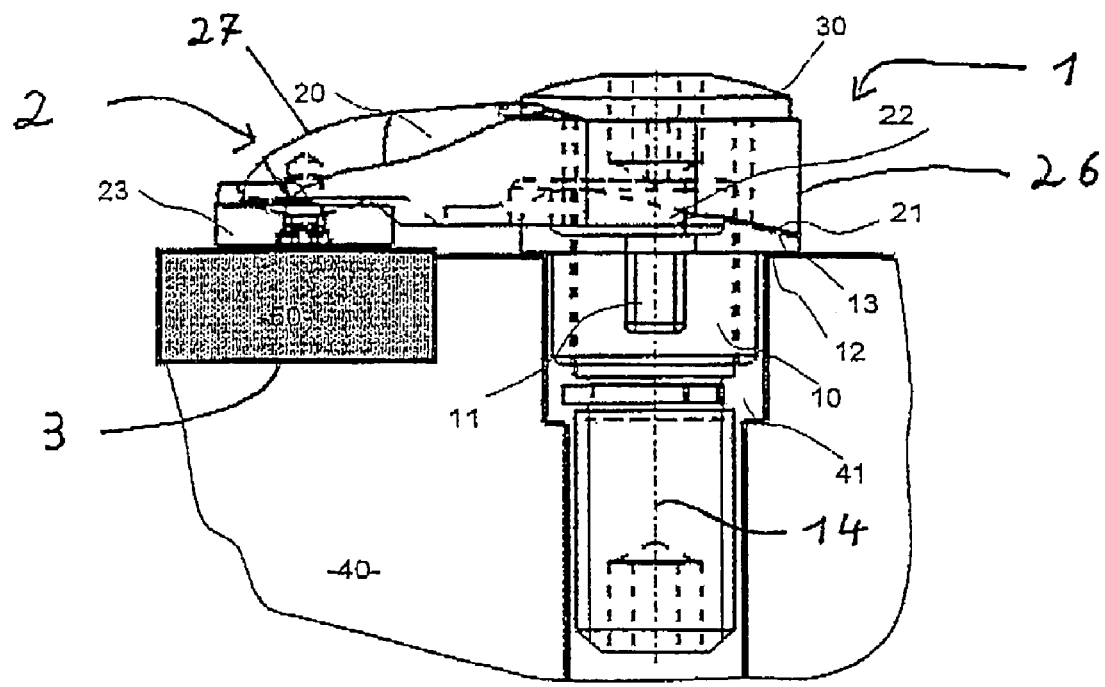
FIG. 1 depicts an embodiment of the clamping claw of the invention.

The invention describes, for the purpose of securing objects, a clamping claw that consists of two portions 10, 20. The first portion, the clamping base 10, projects as a guiding portion on a support 40 into a fitting recess 41 and by its shape 11 (see further below) is made secure against rotation. A clamping finger 20 with its securing leg 26 is mounted on this clamping base 10 and is secured on the support by way of a bolt 30. At the other end of the clamping finger 20, the clamping leg 27, the latter clamps an object 50 in a recess 3 of a support 40. This clamping base 10 during clamping by means of a bolt 30 projecting through both portions executes a movement in the axial direction of the bolt 30 or in the direction of the longitudinal axis 14 of the clamping base 10. This bolt 30 is guided or secured in the support 40.

This movement is limited, as a special feature, by a flange 12 which ultimately rests on the support 40. When as a result of this limitation the end of the axial movement is reached, as a further special feature the securing leg 26 of the clamping finger 20 executes a lateral movement transversely to the longitudinal axis 14 of the clamping base 10 until the desired clamping force is finally achieved by the bolt 30.

This results from the fact that the clamping base 10 at its end that faces the securing leg 26 of the clamping finger 20 has an oblique plane that is formed as a sliding surface 13, and the securing leg 26 of the clamping finger 20 at its end that faces the clamping base 10 likewise has an oblique plane that is formed as a sliding surface 21, and both sliding surfaces 13, 21 are matched to each other and are formed so that they slide one on top of the other.

In this connection, the clamping finger 20 thus slides with the sliding surface 21 of the securing leg 26 over the matched sliding surface 13 of the clamping base 10. The inventive features of these two sliding surfaces 21 and 13 are the shapes that are matched to each other and the pronounced configuration as oblique planes. This sliding movement in turn is guided and limited by a special arrangement 22. This arrangement 22 here is a stop.

When this transverse and sliding movement has terminated and the desired clamping pressure has been achieved by the bolt 30, the clamping leg 27 of the clamping finger 20 can securely clamp the object 50 by means of the clamping pressure exerted and its specially matching shape and surface and hold it immovably in its position.

Figure 2:
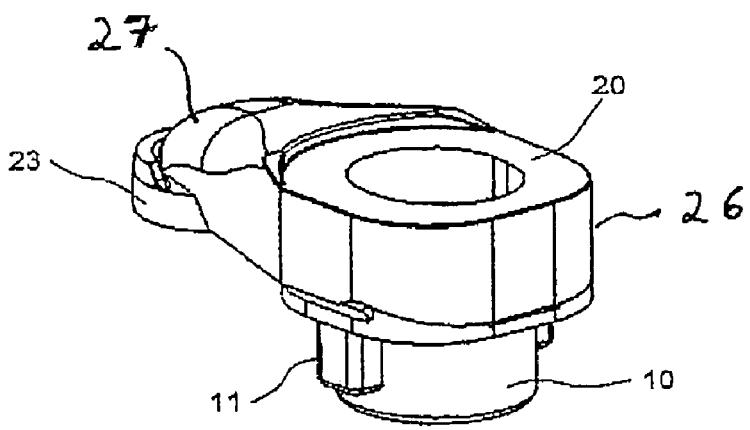
FIGS. 2 and 3 show clamping finger according to the invention mounted upon the clamping base with its shape, a projection, extending in the axial direction.
Figure 3:
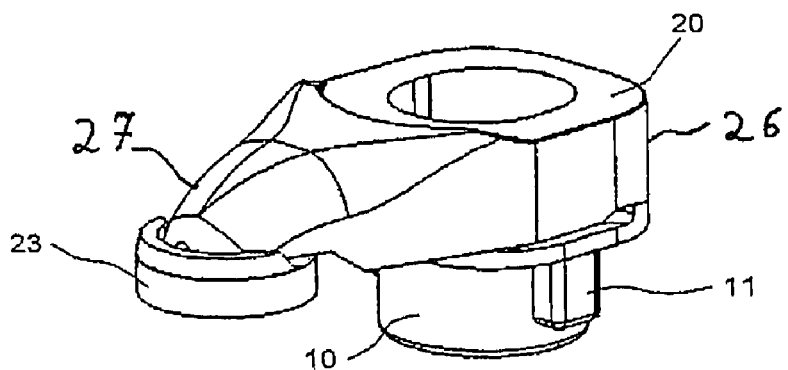

FIGS. 2 and 3 show the clamping finger 20 mounted upon the clamping base 10 with its shape 11, here a projection 11 extending in the axial direction. Arranged at the tip of the clamping leg 27 of the clamping finger 20 there is, for example, a pressure plate 23 with which the object 50 is clamped on the support 40 in the recess 3. Arranged on the pressure plate 23 there is a raised portion 28, for example a cam, which engages into a matched trough in the object 50. The raised portion 28 can also be arranged directly on the clamping leg 27 of the clamping finger 20.

This raised portion 28 or the cam on the clamping leg 27 of the clamping finger 20 is formed as a circular ring for example, which engages into an object 50 that has a spherical or circular raised portion, and in so doing embraces the raised portion.

Figure 4:
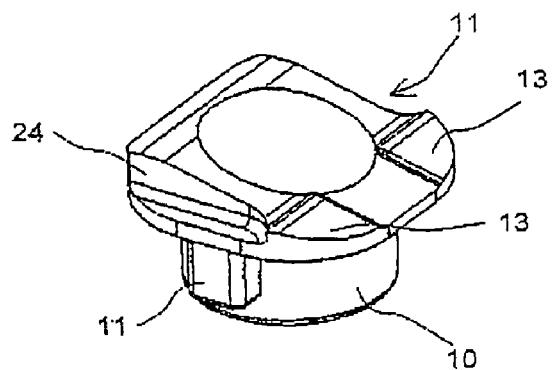
FIG. 4 shows the clamping base according to the invention with its sliding surface formed as an incline.

FIG. 4 shows the clamping base 10 with its sliding surface 13 which is formed as an incline. The sliding surface 21 of the securing leg 26 of the clamping finger 20 that is matched to the sliding surface 13 slides on this sliding surface 13, see FIG. 5. The first guide surface 24 of the special arrangement 22 from FIG. 1 can be seen here clearly.

Figure 5:
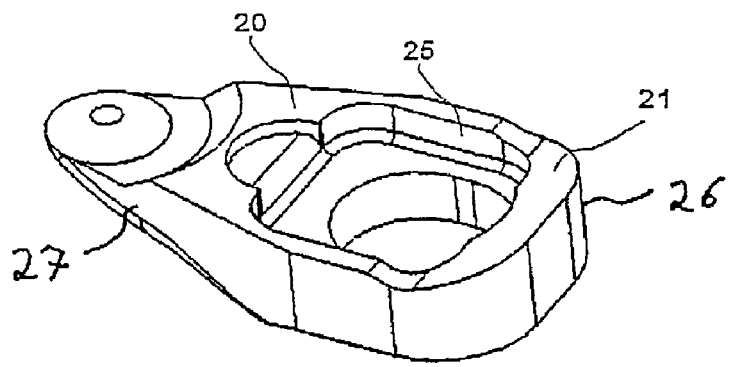
FIG. 5 is a bottom view of the clamping device according to the invention showing the opposite side of special arrangement 22 from FIG. 1.

FIG. 5 shows the clamping finger 20 from its underside. Here the opposite side of the special arrangement 22 from FIG. 1 can be seen with its second guide surfaces 25 on the securing leg 26 matched to the first guide surface 24 of the clamping base 10.

Figure 6:
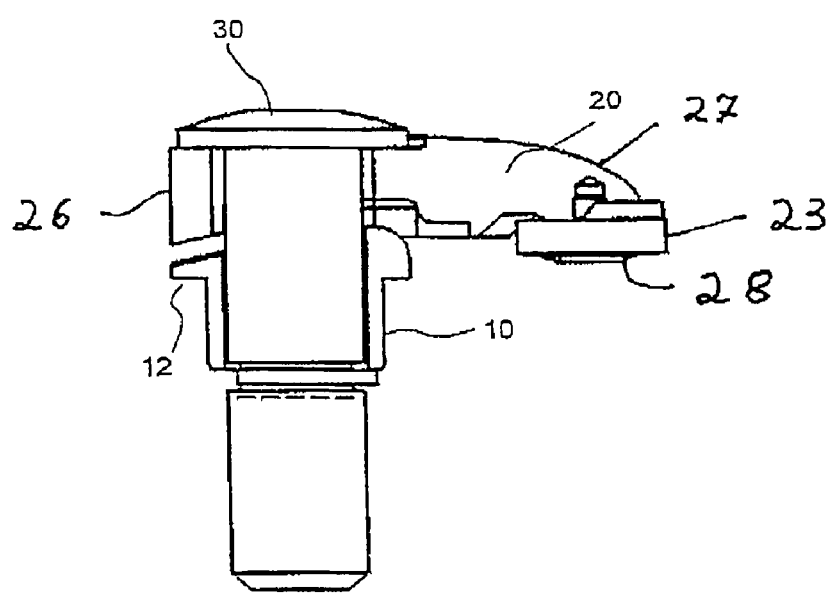
FIG. 6 shows a whole clamping claw with the clamping finger mounted thereon and with an engaging bolt shown in section.

The whole clamping claw with the clamping base 10 and the clamping finger 20 mounted thereon and with an engaging bolt 30 is shown in a section in FIG. 6. The clamping base 10 and the clamping finger 20 are secured to a support 40 by means of the bolt 30 (see FIG. 1).

This principle can be used, for example, in machining. In the case of the machining of metallic materials current prior art is constituted by the use of a variety of carrier tools on which a cutting insert, referred to as an indexable cutting plate, made from hard and wear-resistant material, is secured in a recess called a plate seat. This cutting insert or the indexable cutting plate takes over the actual material-removal as a result of penetration into the work-piece surface and a rotating and advancing movement of the tool and work piece. The object 50 is therefore preferably a cutting plate made from a ceramic material or from hard metal.

The most important criterion in the case of this machining process is the correct, reliable and specific securement of the indexable cutting plate by means of the use of a gripping screw, a wedge or a clamping claw. When a clamping claw is used, this is mostly immovably secured on the carrier tool by means of a screw that projects through the clamping claw. During the securing process, if possible, it should be guaranteed that the indexable cutting plate rests tight against the side walls of the plate seat.

The advantage of this invention lies in the combination of converting the axial movement during clamping over an oblique plane in part into a movement that acts transversely thereto.

What is claimed is:

1. A clamping claw comprising a securing leg and a clamping leg for securing an object in a first recess of a support, with the clamping claw in the installed state being secured on the support by way of its securing leg by means of a bolt and clamping the object in the recess by means of its clamping leg wherein
   the clamping claw comprises a clamping base and a clamping finger,
   the clamping base sits on the support in the installed state of the clamping claw,
   the clamping finger has a securing leg and a clamping leg, and in the installed state the securing leg sits on the clamping base over an oblique plane formed as a sliding surface and clamps the object with its clamping leg, and
   during clamping the bolt presses the securing leg of the clamping finger onto the clamping base and secures both on the support, wherein, as a result of the oblique plane that is formed as a sliding surface, the securing leg and thus the clamping leg of the clamping finger execute a lateral movement transversely in relation to the longitudinal axis of the clamping base.

2. A clamping claw according to claim 1, wherein in order to secure the clamping base on the support in a secure manner with respect to rotation at least one projection that extends parallel to the longitudinal axis of the clamping base and engages into a longitudinal slot in the support that is matched thereto is arranged on the clamping base.

3. A clamping claw according to claim 1, wherein the clamping base at its end that faces the securing leg of the clamping finger has an oblique plane that is formed as a sliding surface, and the securing leg of the clamping finger at its end that faces the clamping base likewise has an oblique plane that is formed as a sliding surface, and both sliding surfaces are matched to each other and are formed so that they slide one on top of the other.

4. A clamping claw according to claim 1, wherein the clamping base in the installed state rests with a first guide surface against a second guide surface on the securing leg of the clamping finger so that the securing leg of the clamping finger is arranged on the clamping base in a secure manner with respect to rotation, but so that it can be displaced in the clamping direction.

5. A clamping claw according to claim 1, wherein that the clamping base has a projecting flange with which the clamping base sits on a recess in the support in the installed state.

6. A clamping claw according to claim 1, wherein the clamping claw is a part of a cutting tool for machining metallic materials, in which case the support is a gripping holder and the object is a cutting plate.

7. A clamping claw according to claim 1, wherein that arranged on the clamping leg of the clamping finger directly or by way of a pressure plate there is a raised portion, like a cam for example, which in the installed state engages into a corresponding trough in the object or in the cutting plate.

8. A clamping claw according to claim 7, wherein the raised portion or the cam on the clamping leg of the clamping finger is formed as a circular ring which in the installed state engages into an object or a cutting plate that has a spherical or circular raised portion and in so doing embraces the raised portion.

9. A clamping claw according to claim 2, wherein the clamping base at its end that faces the securing leg of the clamping finger has an oblique plane that is formed as a sliding surface, and the securing leg of the clamping finger at its end that faces the clamping base likewise has an oblique plane that is formed as a sliding surface, and both sliding surfaces are matched to each other and are formed so that they slide one on top of the other.

* * * * *